US012774961B2

(12) United States Patent
Kotani et al.

(10) Patent No.: US 12,774,961 B2
(45) Date of Patent: Oct. 27, 2026

(54) SUBSTRATE, ANALYSIS METHOD, APPARATUS, AND METHOD OF MANUFACTURING SUBSTRATE

(71) Applicant: CANON KABUSHIKI KAISHA, Tokyo (JP)

(72) Inventors: Yoshinori Kotani, Kanagawa (JP); Hiroshi Saito, Kanagawa (JP); Nobuki Yoshimatsu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 163 days.

(21) Appl. No.: 18/922,953

(22) Filed: Oct. 22, 2024

(65) Prior Publication Data

US 2025/0044232 A1 Feb. 6, 2025

Related U.S. Application Data

(63) Continuation of application No. PCT/JP2023/014611, filed on Apr. 10, 2023.

(30) Foreign Application Priority Data

Apr. 27, 2022 (JP) ................................ 2022-073277
Jan. 25, 2023 (JP) ................................ 2023-009356

(51) Int. Cl.
*G01N 21/65* (2006.01)
*G01J 3/44* (2006.01)

(52) U.S. Cl.
CPC .......... *G01N 21/658* (2013.01); *G01J 3/4412* (2013.01); *G01N 21/65* (2013.01)

(58) Field of Classification Search
CPC ...... G01N 21/65; G01N 21/658; G01J 3/4412
See application file for complete search history.

(56) References Cited

U.S. PATENT DOCUMENTS 11,567,069 B2 * 1/2023 Kanno ................. G01N 33/553
2009/0279084 A1 * 11/2009 Suzuki ................. G01N 21/658 29/460
2014/0016127 A1 * 1/2014 Yamazoe ............. G01N 21/648 359/334

FOREIGN PATENT DOCUMENTS

JP 2012063293 A 3/2012
JP 2015052562 A * 3/2015

(Continued)

OTHER PUBLICATIONS

Luo, Sihai et al. "Scalable Fabrication of Metallic Nanogaps as the Sub-10 nm Level". Adv Sci (Weinh), 8(24), Oct. 31, 2021. (Year: 2021).*

(Continued)

*Primary Examiner* — Michael A Lyons
(74) *Attorney, Agent, or Firm* — Canon U.S.A., Inc. IP Division

(57) ABSTRACT

A substrate includes projections containing metal. The projections include a first projection on which a first metal portion is formed, the first metal portion containing at least one of gold, silver, platinum, copper, and palladium. The projections include a second projection that is different from the first projection and on which a second metal portion is formed, the second metal portion containing at least one of gold, silver, platinum, copper, and palladium. The substrate further includes a dielectric portion that is present between the first projection and the first metal portion and between the second projection and the second metal portion. A surface of the dielectric portion facing opposite to the projections follows shapes of the projections. A gap is provided between the first metal portion and the second metal portion, and a distance between the first metal portion and the second metal portion is 50 nm or less.

24 Claims, 8 Drawing Sheets

(56) References Cited

FOREIGN PATENT DOCUMENTS

| | | | | | |
|---|---|---|---|---|---|
| JP | 2016153740 | A | | 8/2016 | |
| JP | 2017181308 | A | | 10/2017 | |
| JP | 2019128282 | A | | 8/2019 | |
| JP | 2021076470 | A | | 5/2021 | |
| WO | WO-2016051666 | A1 | * | 4/2016 | ............. G01N 31/00 |
| WO | WO-2017200259 | A1 | * | 11/2017 | ........... H04N 19/597 |

OTHER PUBLICATIONS

Luo, Sihai et al. “Massively Parallel Arrays of Size-Controlled Metallic Nanogaps with Gap-Widths Down to the Sub-3-nm Level”. Adv Mater., 33(20), May 3, 2021. (Year: 2021).*

* cited by examiner

SUBSTRATE, ANALYSIS METHOD, APPARATUS, AND METHOD OF MANUFACTURING SUBSTRATE

CROSS-REFERENCE TO RELATED APPLICATIONS

This application is a Continuation of International Patent Application No. PCT/JP2023/014611, filed Apr. 10, 2023, which claims the benefit of Japanese Patent Application No. 2022-073277, filed Apr. 27, 2022, and Japanese Patent Application No. 2023-009356, filed Jan. 25, 2023, all of which are hereby incorporated by reference herein in their entirety.

TECHNICAL FIELD

The present invention relates to a substrate.

BACKGROUND ART

When a metal is irradiated with light, plasmon resonance occurs at the surface of the metal, which produces electric-field enhancement effect. This phenomenon is called "localized plasmon resonance". Development of devices utilizing the electric-field enhancement effect is going on. Examples are sensor devices and devices for Raman spectroscopy. A known method of Raman spectroscopy utilizes the enhanced optical electric field enhanced by the localized plasmon resonance in order to enhance Raman scattered light.

For example, PTL 1 discloses a device including a boehmite layer and a metal film. The boehmite layer has a fine uneven structure, and the metal film is formed on the fine uneven structure.

CITATION LIST

Patent Literature

PTL 1 Japanese Patent Laid-Open No. 2012-63293

The device disclosed by PTL 1 cannot always generate scattered light favorably depending on a type of specimen, which may cause Raman scattered light to become weak. Accordingly, the present invention is directed to improve the intensity of Raman scattered light.

SUMMARY OF INVENTION

According to an aspect of the present invention, a substrate includes projections containing metal. In the substrate, the projections include a first projection on which a first metal portion is formed, the first metal portion containing at least one of gold, silver, platinum, copper, and palladium. The projections also include a second projection that is different from the first projection and on which a second metal portion is formed, the second metal portion containing at least one of gold, silver, platinum, copper, and palladium. The substrate further includes a dielectric portion that is present between the first projection and the first metal portion and also between the second projection and the second metal portion. A surface of the dielectric portion facing opposite to the projections follows shapes of the projections. A gap is provided between the first metal portion and the second metal portion, and a distance between the first metal portion and the second metal portion is 50 nm or less.

According to another aspect of the present invention, a method of manufacturing a substrate includes a step of forming a dielectric portion having a first uneven structure formed on a surface thereof; a step of forming a structure body on the first uneven structure, the structure body containing metal and having a second uneven structure that is copied from the first uneven structure; a step of removing part of the dielectric portion in such a manner that the dielectric portion remains so as to cover projections of the second uneven structure and that a distance between a surface of the dielectric portion opposite to the structure body and a depression of the second uneven structure is smaller than a height difference between the projections and a depression of the structure body, the depression being adjacent to the projections; and a step of forming a first metal portion and a second metal portion, the first metal portion being formed on the dielectric portion that covers a first projection of the projections, the second metal portion being formed on the dielectric portion that covers a second projection of the projections, the second projection being different from the first projection, the first metal portion and the second metal portion containing at least one of gold, silver, platinum, copper, and palladium. In the step of forming the first metal portion and the second metal portion, a gap is provided between the first metal portion and the second metal portion, and a distance between the first metal portion and the second metal portion is 50 nm or less.

Further features of the present invention will become apparent from the following description of exemplary embodiments with reference to the attached drawings.

DESCRIPTION OF EMBODIMENTS

Figure 1A:
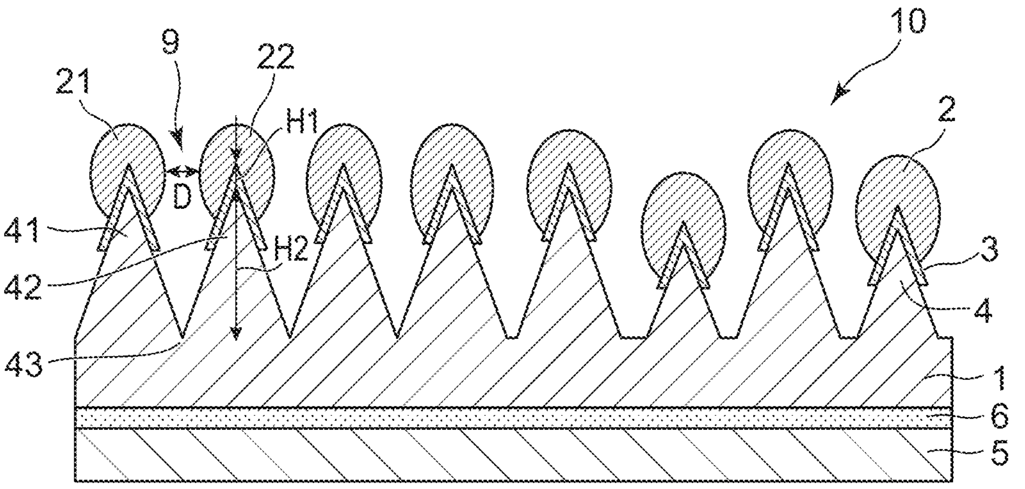
FIG. 1A is a schematic view illustrating a substrate according to an embodiment.

Embodiments of the present invention will be described with reference to the drawings. The embodiments described below are among embodiments of the present invention and are not intended to limit the present invention. Features of each embodiment will be described while referring to multiple drawings. The same or similar elements will be denoted by the same reference signs, and duplicated descriptions will be omitted. Different elements having the same name will be distinguished by adding ordinary numbers as in a first element, a second element, etc.

First Embodiment

A substrate 10 according to the present embodiment will be described with reference to FIGS. 1A and 1B. The substrate 10 includes a structure body 1, dielectric portions 3 disposed on the surface of the structure body 1, and metal portions 2 disposed so as to interface with respective dielectric portions 3. The structure body 1 has an uneven structure formed of projections 4 and depressions, and the projections 4 include a projection 41 and a projection 42. A dielectric portion 3 and a metal portion 2 are formed on each projection 4. The dielectric portion 3 is formed between the metal portion 2 and the structure body 1. The dielectric portion 3 preferably interfaces with both the metal portion 2 and the structure body 1.

A gap 9 is provided between a metal portion 21 and a metal portion 22 that is adjacent to the metal portion 21. A distance D between the metal portion 21 and the metal portion 22 is greater than 0 and not greater than 50 nm. More preferably, the distance D between the metal portion 21 and the metal portion 22 is greater than 0 and not greater than 10 nm. Here, the distance D is defined as the shortest distance between the metal portion 21 and the metal portion 22. Although the distance D is described as the distance between the metal portion 21 and the metal portion 22, which is preferable, the distance D may be a distance between adjacent metal portions 21 in the case where multiple metal portions 21 are formed on the same projection 41. The distance D may be a distance between the metal portion 21 and another metal portion 2 formed on an adjacent projection 4 that is different from the projection 42 positioned adjacent to the projection 41. Providing the gap 9 can further enhance optical electric field, thereby intensifying Raman scattered light at the substrate 10. The metal portion 21 and the metal portion 22 may be connected to each other at a position other than the gap 9 formed therebetween. It is preferable, however, that the metal portion 21 and the metal portion 22 be discontinuous with each other.

Figure 1B:
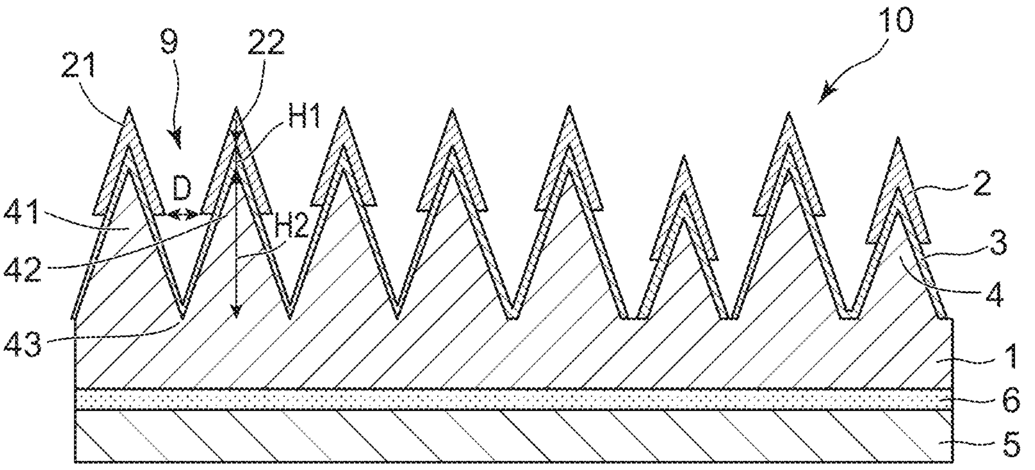
FIG. 1B is a schematic view illustrating the substrate according to the embodiment.

In FIG. 1A, each metal portion 2 is shaped like a round head. The metal portion 2 may be shaped so as to follow the surface of the dielectric portion 3 as illustrated in FIG. 1B. The shape of the metal portions 2 is not specifically limited. In addition, the dielectric portion 3 may also be formed at a depression 43 as illustrated in FIG. 1B so that the dielectric portion 3 on the projection 41 continues to the dielectric portion 3 on the projection 42. The metal portion on the projection 41 and the metal portion on the projection 42 may be discontinuous with each other. It is preferable that the metal portion 2 do not cover the depression 43 and that the dielectric portion 3 be exposed at the depression 43.

It is preferable that the uneven structure be formed on only one of the principal surfaces of the structure body 1. The distance between the projection 41 and the depression 43, in other words, the height difference is preferably 100 nm or more and 1000 nm or less, and more preferably, 100 nm or more and 500 nm or less. The height difference is preferably the average height difference of the uneven structure. The height difference may be a distance along a straight line drawn from the top of the projection 41 to the bottom of the depression 43 or may be the vertical distance therebetween. The height difference can be measured by observing a section of the substrate 10 using a scanning electron microscope. The depression 43 preferably connects the projection 41 to the projection 42. However, the projection 41 and the projection 42 may be separated from each other. The projections 4 of the structure body 1 are made of a metal, whereas a portion of the structure body 1 defining the depression 43 may be made of a nonmetal, such as ceramic or resin.

The material of the structure body 1 is preferably an electrically conductive material, such as gold, silver, copper, aluminum, magnesium, tungsten, cobalt, zinc, nickel, or chromium. Among these, nickel, zinc, and chromium are more preferable, and nickel is especially preferable.

The material of the metal portions 2 includes at least one metal selected from the group consisting of gold, silver, platinum, copper, and palladium. It is especially preferable that the material of the metal portions 2 be gold or silver. The thickness of each metal portion 2 is not specifically limited insofar as the uneven structure can receive excitation light and thereby generate localized plasmon. It is preferable, however, that the thickness be 5 nm or more and 50 nm or less.

The material of the dielectric portions 3 is preferably metallic oxide. The composition of the metallic oxide is not specifically limited, but the metallic oxide preferably contains alumina as a main ingredient. It is more preferable that the metallic oxide contain tabular crystals of which alumina is a main ingredient. The tabular crystals of alumina as the main ingredient are made mainly of an aluminum oxide or hydroxide or a hydrate thereof. It is especially preferable that the tabular crystals be made of boehmite. The tabular crystals of alumina as the main ingredient may be made solely of alumina or may be made of alumina with a small quantity of zirconium, silicon, titanium, and zinc. The tabular crystals of alumina as the main ingredient are preferably arranged so as to stand vertically with respect to the principal surface of the structure body 1, and the filling factor of the crystals preferably changes continuously. The metallic oxide may include amorphous gel of alumina. As illustrated in FIG. 1B, the dielectric portions 3 is preferably formed so as to follow the uneven structure, or the projections 4, of the structure body 1. The thickness of each dielectric portion 3 is preferably 30 nm or more and 200 nm or less.

The substrate 10 of the present embodiment preferably has a specific surface Sr of 1.0 or more and 3.0 or less. The specific surface Sr is obtained from the following equation.

$$Sr=S/S0 \quad \text{Equation 1}$$

In Equation 1, S is an actual area of a target surface obtained by measurement, and S0 is an area of the target surface when the target surface is assumed to be perfectly flat. The specific surface can be obtained by observing the surface of the substrate 10 having the uneven structure using a scanning probe microscope.

Metallic elements of the structure body 1 and metallic oxides contained in the dielectric portions 3 can be determined by observing the surface using a scanning electron microscope (SEM), a transmission electron microscope (TEM), or by observing a section using an energy dispersive X-ray spectroscopy (EDX). An X-ray photoelectron spectroscopy (XPS) also can be used to determine these metallic elements and oxides. In observation of a section sliced in a direction normal to the principal surface of the structure body 1, the ratio of the metallic oxides detected gradually decreases from the dielectric portions 3 toward the structure body 1, while the ratio of the metallic elements for forming the structure body 1 gradually increases. Finally, only the metallic elements are detected.

The substrate 10 has a support base 5 formed on the principal surface opposite to the uneven structure of the structure body 1. The support base 5 is attached to the structure body 1 with an adhesive layer 6 interposed therebetween. The adhesive layer 6 may be omitted. The shape of the support base 5 is not specifically limited but may be suitable for intended usage. The support base 5 may be shaped like a plate, a film, or a sheet. The material of the support base 5 includes, but is not limited to, metal, glass, ceramic, wood, paper, or resin. Examples of the resin include polyester, triacetyl cellulose, cellulose acetate, polyethylene terephthalate, polypropylene, polystyrene, polycarbonate, polymethyl methacrylate, or ABS resin. The support base 5 may be a film or a mold product made of a thermoplastic resin, such as polyphenylene oxide, polyurethane, polyethylene, or polyvinyl chloride, or made of a thermosetting resin, such as unsaturated polyester resin, phenol resin, cross-linked polyurethan, cross-linked acrylic resin, or cross-linked saturated polyester resin. The adhesive layer 6 may be any type of layer insofar as the adhesive layer 6 can adhere the structure body 1 to the support base 5. For example, the adhesive layer 6 is a layer of a solidified adhesive resin (such as epoxy resin) or a double-sided adhesive tape.

Next, a method of manufacturing the substrate 10 will be described with reference to FIGS. 2A to 2H. The manufacturing method according to the present embodiment includes a step of forming the structure body 1, a step of forming the dielectric portions 3, and a step of forming the metal portions 2.

Figure 2A:
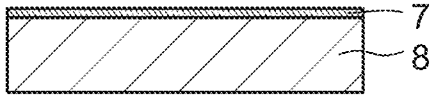
FIG. 2A is a schematic view illustrating a method of manufacturing the substrate of the embodiment.
Figure 2B:
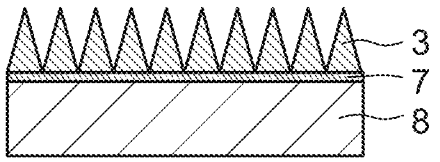
FIG. 2B is a schematic view illustrating the method of manufacturing the substrate of the embodiment.

The step of forming a dielectric portion 3 is described with reference to FIGS. 2A and 2B. The dielectric portion 3 contains metallic oxides including alumina. A sol-gel coating liquid is first prepared by dissolving or dispersing in an organic solvent an aluminum compound, other compounds if necessary, a stabilizing agent, and a water-soluble high-molecular organic compound. The sol-gel coating liquid is subsequently applied onto a base material 8 and dried to form an alumina gel film, which contains aluminum and serves as an aluminum film 7. Alternatively, a dry process, such as the vacuum deposition or the sputtering, can be employed to form the alumina gel film on the base material 8, the alumina gel film containing metallic aluminum and serving as the aluminum film 7.

Next, the aluminum film 7 is immersed in hot water to form the uneven structure of alumina. When the aluminum film 7 is immersed in the hot water, the surface of the aluminum film 7 is subjected to peptization, and some components of the aluminum film 7 are eluted. Due to the hydroxides contained having different solubilities in the hot water, tabular crystals of alumina as the main ingredient precipitate and grow on the surface of the aluminum film 7 to form the uneven structure of the dielectric portion 3. When the film made of metallic aluminum is used in place of the aluminum film 7, the metallic aluminum reacts with the hot water and is oxidized to alumina first, and the uneven structure of the dielectric portion 3 is subsequently formed as is the case of using the aluminum film 7. For this reason, if the base material 8 is made of a material containing aluminum or alumina as a main ingredient, the formation of the aluminum film 7 on the base material 8 can be omitted. The temperature of the hot water is preferably 40° C. or more and less than 100° C. It is preferable that the period of immersion be about 5 minutes to about 24 hours. In the case of immersion of the aluminum film 7 to which compounds other than alumina is added, tabular crystals of alumina are formed due to solubility difference of different components in the hot water. In this case, the size of the tabular crystals can be controlled over a wide range by changing the composition of inorganic components of the aluminum film 7, which is different from the immersion treatment of the aluminum film 7 that is made solely of alumina. The height difference of the unevenness of alumina can be adjusted by adjusting the thickness of the aluminum film 7. The average height difference of the uneven structure of the dielectric portion 3 is preferably 100 nm or more and 1000 nm or less, and more preferably 100 nm or more and 500 nm or less. The thickness of the dielectric portion 3 is preferably 30 nm or more and 200 nm or less. Accordingly, the projections and depressions formed of the tabular crystals can be controlled over a wide range.

The material of the base material 8 is not specifically limited. Various materials, such as glass, plastic, or metal, can be used. When the aluminum film 7 is formed using a sol-gel coating liquid that does not contain the stabilizing agent, it is preferable that the liquid application be performed in an atmosphere of inert gas, such as dry air or dry nitrogen. The relative humidity of the dry atmosphere is preferably 30% or less. A known method can be employed to apply the coating liquid to form the aluminum film 7, which includes, for example, dipping, spin coating, spray coating, printing, flow coating, or a combination of these. The film thickness can be controlled, for example, by controlling the withdrawal speed in the dipping or the rotation speed of the substrate in the spin coating or by controlling the concentration of the sol-gel coating liquid. The drying time may be about 30 minutes at room temperature. High-temperature drying or heat treatment may be employed if necessary. In this case, the higher the temperature of heat treatment, the more stable the growth of the uneven structure of the dielectric portion 3 in the subsequent immersion treatment. The thickness of the aluminum film 7 may be 100 nm or more and 600 nm or less, preferably 100 nm or more and 300 nm or less, and more preferably 100 nm or more and 200 nm or less.

Figure 2C:
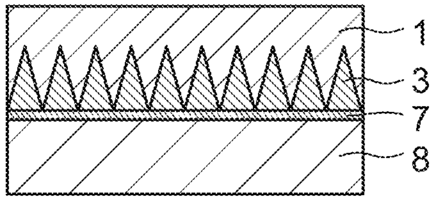
FIG. 2C is a schematic view illustrating the method of manufacturing the substrate of the embodiment.

Next, the step of forming the structure body 1 is described with reference to FIG. 2C. The structure body 1 containing metal is formed on the uneven structure of the dielectric portion 3 of FIG. 2B. It is preferable to employ metal plating to form the structure body 1. In this case, it is more preferable to employ electroless plating. In the electroless plating, the uneven structure of the dielectric portion 3 is first activated by applying an aqueous solution containing a palladium compound such as palladium chloride, a gold compound such as gold chloride, a silver compound such as silver chloride, or a tin compound such as tin chloride. The activation treatment may be performed by immersing the uneven structure of the dielectric portion 3, together with the base material 8, in the aqueous solution of the palladium compound. Subsequently, the material of the structure body 1 is deposited onto the uneven structure of the dielectric portion 3 using an electroless-plating solution. Metal ions contained in the electroless-plating solution are selected so as to be suitable for forming the structure body 1 of the substrate 10 of the present embodiment. The electroless-plating solution preferably contain nickel ions, chromium ions, or zinc ions. More preferably, the electroless-plating solution is the nickel-plating solution containing nickel ions. The nickel-plating solution may contain phosphorus and boron in addition to nickel. The temperature of the electroless plating solution is preferably 30° C. or more and 98° C.

or less, and more preferably 50° C. or more and 90° C. or less. Plating time of the electroless plating is typically from 30 seconds to 1 hour but may be adjusted in accordance with the thickness of the structure body 1. Consequently, the structure body 1 is formed so as to fill the depressions of the uneven structure. Accordingly, the structure body 1 also has the uneven structure that is copied from the uneven structure of the dielectric portion 3. The electroless plating is preferably performed so as to cause the structure body 1 with the uneven structure to have a thickness of 200 nm or more and 15000 nm or less. The average height difference of the uneven structure of the structural body 1 corresponds to that of the uneven structure of the dielectric portion 3, which is 100 nm or more and 1000 nm or less.

In order to increase the thickness of the structure body 1 after the electroless plating, electroplating may be performed on the surface of the structure body 1, the surface being opposite to the uneven structure. In this case, a known electroplating solution can be used in the electroplating. For example, the electroplating solution may contain metal ions, such as nickel ions, iron ions, or copper ions. Electroplating using the same metal as that of the structure body 1 can increase the thickness of the structure body 1. Electroplating using a metal different from that of the structure body 1 can form a metal layer serving as the support base. In addition to an inorganic salt for providing the metal ions, the electroplating solution may contain an electroconductive salt, a salt for controlling counterions, a carboxylic acid-based additive for improving homogeneity of the plated film, and a brightener, when necessary. A desirable thickness of the structure body 1 can be obtained by adjusting the temperature of the electroplating solution, the electric current density, and the plating time in the step of electroplating. The surface of the structure body 1, which is the surface opposite to the uneven structure of the structure body 1, may be activated before the step of electroplating, if necessary, by using an aqueous solution containing an acid or the like. During the electroplating, the electroplating solution may be agitated and foreign matter is removed in order to improve the quality of the electroplated film.

Figure 2D:
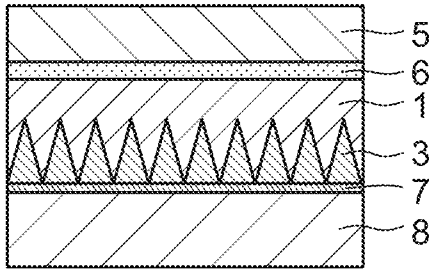
FIG. 2D is a schematic view illustrating the method of manufacturing the substrate of the embodiment.

Next, a step of adhering the support base 5 to the structure body 1 is described with reference to FIG. 2D. In the case of the material of the support base 5 being a metal, a layer of the metal may be formed on the surface of the structure body 1, the surface being opposite to the uneven structure thereof. The metal layer can be formed using the above-described electroplating or using a physical vapor deposition such as sputtering. In the case of the material of the support base 5 being a resin, the resin is applied and solidified on the surface of the structure body 1, the surface being opposite to the uneven structure thereof. The adhesive layer 6 may be used to attach the support base 5 to the structure body 1. The adhesive used for the adhesive layer 6 is preferably a resin but is not limited thereto. The adhesive may be made of any type of material that can cause the support base 5 to adhere to the structure body 1.

Figure 2E:
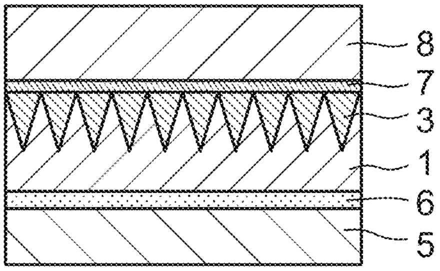
FIG. 2E is a schematic view illustrating the method of manufacturing the substrate of the embodiment.
Figure 2F:
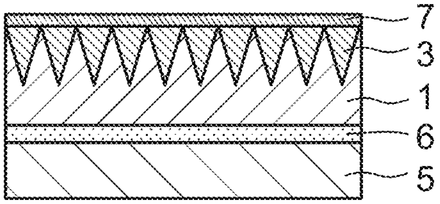
FIG. 2F is a schematic view illustrating the method of manufacturing the substrate of the embodiment.
Figure 2G:
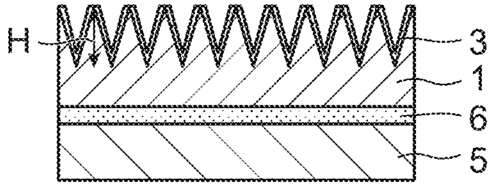
FIG. 2G is a schematic view illustrating the method of manufacturing the substrate of the embodiment.

Next, a step of etching for removing the base material 8 and the aluminum film 7 as well as part of the dielectric portion 3 is described with reference to FIGS. 2E, 2F, and 2G. The substrate in FIG. 2E is obtained by turning the substrate in FIG. 2D upside down. The base material 8 is removed first as illustrated in FIG. 2F. In the case of the aluminum film 7 being the alumina gel film, the aluminum film 7 can serve as part of the dielectric portion 3 of the substrate 10. In this case, the aluminum film 7 may be etched partially. Regarding the method of etching, it is preferable to use the wet etching in which the film containing aluminum is dissolved in an acid or alkaline solution. Examples of the acid include hydrochloric acid, nitric acid, or sulfuric acid. Examples of the alkali include sodium hydroxide and potassium hydroxide. Etching with the alkaline solution is preferable from the point of view of work efficiency. The etchant concentration is in a range of several to several tens of percent, and the etching time is in a range of several hours to several days. The residue of the metallic oxide after the etching, such as alumina, can be detected, for example, by observing the surface using SEM or TEM or by observing the section using EDX or XPS. In this step, the dielectric portion 3 is removed in such a manner that a distance H1 to the depression of the copied uneven structure of the structure body 1 becomes smaller than a height difference H2 between the depression and an adjacent projection of the structure body 1. The distance H1 can be zero. In other words, the dielectric portion 3 at the depression can be entirely removed by etching. In this case, the projections of the uneven structure of the structure body 1 are covered with respective dielectric portions 3. The dielectric portion 3 is removed partially in such a manner that the surface of the dielectric portion 3, the surface being opposite to the structure body 1, follows the copied uneven structure of structure body 1. The step of etching may be performed before the step of adhering the support base 5. The support base 5 may be adhered after the step of etching.

Figure 2H:
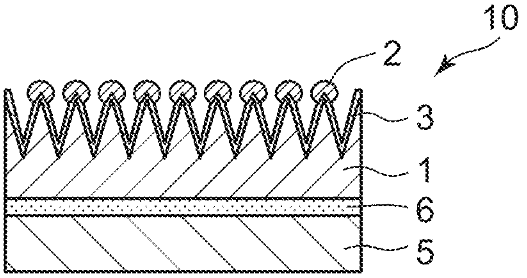
FIG. 2H is a schematic view illustrating the method of manufacturing the substrate of the embodiment.

Next, the step of forming the metal portions 2 is described with reference to FIG. 2H. The metal portions 2 containing a metal selected from the group consisting of gold, silver, platinum, copper, and palladium are formed on the product obtained after the etching step, using a dry process of deposition, such as vacuum deposition or sputtering.

The substrate 10, which is obtained using the method of manufacturing the substrate 10 according to the present embodiment, has a uniform surface quality. Accordingly, the substrate 10 can provide reproducible measurement data, which enables reliable and effective measurement. The above-described manufacturing method is quite simple so that the manufacturing cost can be reduced compared with the known method.

The substrate 10 of the present embodiment can be used not only for the surface-enhanced Raman spectroscopy. The substrate 10 can also be applied to a fluorescence enhancement device for fluorescence detection. The substrate 10 of the present embodiment can be used not only for the detection of Raman scattered light or fluorescence but also for the detection of Rayleigh scattered light, Mie scattered light, or second harmonic generated from a specimen when irradiated with excitation light. The substrate 10 of the present embodiment can enhance Raman scattered light due to the enhanced optical electric field generated in association with localized plasmon resonance.

Various adhesives can be used when the substrate 10 of the present embodiment is mounted on another member or item. The substrate 10 of the present embodiment can be mounted on the surface of various members or items depending on the intended usage, and the surface is not only a flat surface but may be a developable curved surface or a non-developable curved surface.

Figure 3:
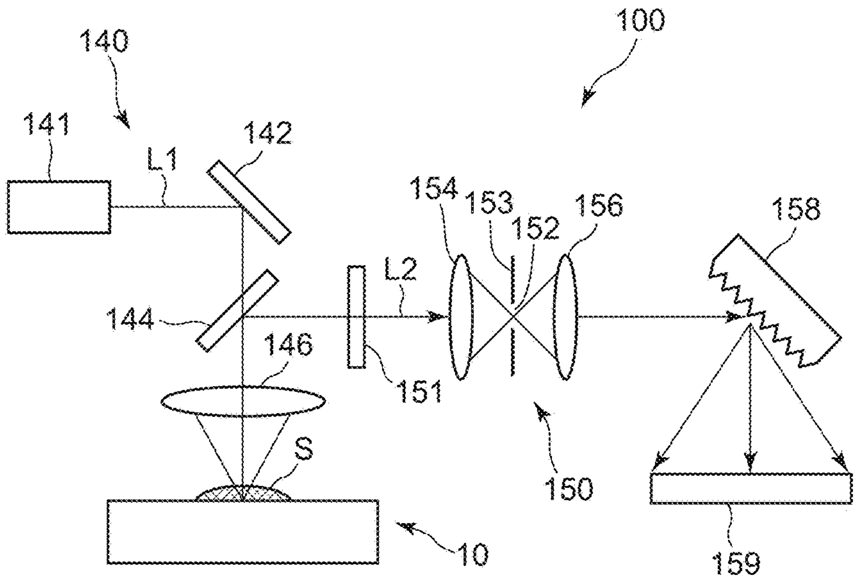
FIG. 3 is a schematic view illustrating an apparatus equipped with the substrate of the embodiment.

Next, referring to FIG. 3, a Raman spectroscope will be described as an example of an apparatus 100 equipped with the substrate 10 of the present embodiment.

An apparatus 100 include the substrate 10, a light emitting section 140 configured to emit light L1 onto the substrate 10, and a light detection section 150 configured to detect Raman scattered light L2 from a specimen S.

The light emitting section 140 further includes a laser 141, a mirror 142, a half mirror 144, and a lens 146. The laser 141 emits Light L1, and the mirror 142 reflects the light L1 toward the substrate 10. The light L1 reflected by the mirror 142 passes through the half mirror 144. The light L1 is subsequently condensed by the lens 146 and focused on a region of the substrate 10 on which the specimen S is placed. The specimen S on the substrate 10 is irradiated with the light L1 and scatters light that includes Raman scattered light L2, and the half mirror 144 reflects the scattered light toward the light detection section 150.

The light detection section 150 includes a notch filter 151, a pinhole plate 153 through which a pinhole 152 is formed, a lens 154, a lens 156, a spectroscope 158, and a detector 159. The light reflected by the half mirror 144 is incident on the notch filter 151. The notch filter 151 absorbs light having the same wavelength of the light L1 and transmits light of other wavelengths. The pinhole plate 153 having the pinhole 152 removes noise from the light transmitted through the notch filter 151. After Raman scattered light L2 is transmitted through the lens 146 and the notch filter 151, the lens 154 focuses the Raman scattered light L2 onto the pinhole 152, and the lens 156 collimates the light passing through the pinhole 152. The Raman scattered light L2 collimated by the lens 156 is dispersed by the spectroscope 158 and the dispersed light is detected by the detector 159.

Irradiation of the light L1 induces localized plasmon resonance at the uneven structure of the substrate 10 and generates enhanced optical electric field on the surface of each metal portion 2. The Raman scattered light L2 emitted from the specimen S is enhanced by the enhanced optical electric field. The enhanced Raman scattered light L2 is transmitted through the lens 146 and reflected by the half mirror 144 toward the spectroscope 158. Here, the light L1 reflected by the substrate 10 is also reflected by the half mirror 144 toward the spectroscope 158. The light L1, however, is removed by the notch filter 151. On the other hand, the light having wavelengths different from the light L1 passes through the notch filter 151 and is focused by the lens 154 onto the pinhole 152 and collimated by the lens 156 and is incident on the spectroscope 158 and detected by the detector 159. In the Raman spectroscope, Rayleigh scattered light (or Mie scattered light), which has the same wavelength of light L1, is removed by the notch filter 151 and does not reach the spectroscope 158. The Raman scattered light L2 is incident on the detector 159 and subjected to Raman spectrum measurement and analysis.

The wavelength of the light emitted by the laser 141 onto the specimen S can be selected arbitrarily depending on the environment of measurement. The light emitted by laser 141 ranges from ultraviolet light to visible light and further to near-infrared light. Particular wavelength light, however, may deteriorate the quantum yield of the detector 159 or may induce fluorescence of the specimen S. Accordingly, it is preferable that the wavelength of the light emitted onto the specimen S be in a range of 400 nm or more and 850 nm or less.

The Raman spectroscope has been described as an example of the apparatus 100. The apparatus 100, however, is not limited to the Raman spectroscope but may be a Raman spectroscopy microscope or a fluorescence detector.

Second Embodiment

Next, a substrate 10 according to a second embodiment will be described with reference to FIG. 4.

The present embodiment differs from the first embodiment in that the structure body 1 of the substrate 10 has a multi-tiered structure. The multi-tiered structure consists of at least two structures having different structural sizes. For example, the multi-tiered structure includes a first structure having a structural size of micron order and a second structure having a structural size of submicron order. The height difference of the first structure having the micron-order structural size is, for example, 1 μm or more and 10 μm or less.

The structure body 1 includes a base portion 11 formed on the adhesive layer 6 and an uneven structure 12 formed on the base portion 11. The uneven structure 12 further includes a first uneven structure 121 and a second uneven structure 122 having smaller projections and depressions than those of the first uneven structure 121. The second uneven structure 122 is formed on the first uneven structure 121, and each of the first uneven structure 121 and the second uneven structure 122 includes multiple projections and multiple depressions formed between adjacent projections.

As is the case for the first embodiment, metal portions 2 are formed on respective projections of the second uneven structure 122, and dielectric portions 3 are formed between the structure body 1 and respective metal portions 2. Gaps are provided between adjacent metal portions 2 formed on the projections of the second uneven structure 122. Providing the gaps can further enhance optical electric field, thereby intensifying Raman scattered light at the substrate 10.

It is preferable that the first uneven structure 121 and the second uneven structure 122 be made of the same material. It is also preferable that the base portion 11 be made of the same material. The distance between a projection and an adjacent depression of the second uneven structure 122, in other words, the height difference of the uneven structure, is preferably 100 nm or more and 1000 nm or less, and more preferably, 100 nm or more and 500 nm or less.

When the uneven structure is formed on the multi-tiered structure as in the present embodiment, a support base to be used for the support base 5 may have micro-order projections and depressions on the surface thereof. In this case, for example, the support base may be, but is not limited to, a frosted glass plate processed by an abrasive or by an acid or alkali etchant or a substrate processed using electron beams.

Figure 4:
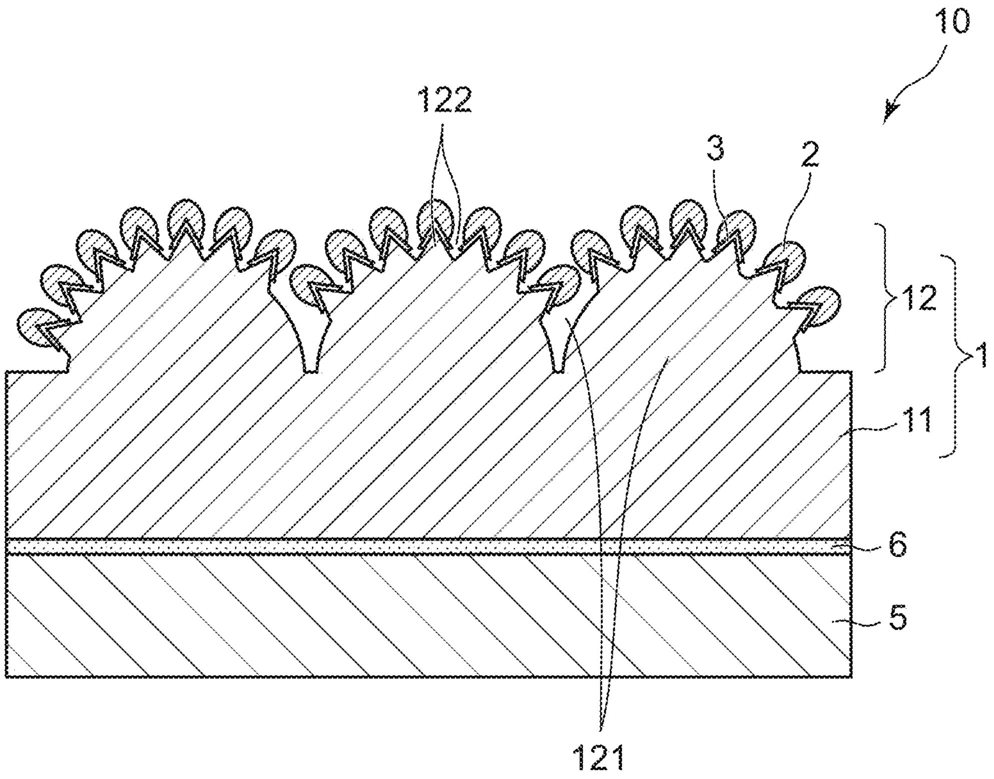
FIG. 4 is a schematic view illustrating a substrate according to a second embodiment.

In FIG. 4, each metal portion 2 of the multi-tiered structure is shaped like a round head as is in FIG. 1A. The metal portions 2 may be shaped so as to follow respective surfaces of the dielectric portions 3 as illustrated in FIG. 1B.

EXAMPLES

Examples will be described below. The examples described below are not intended to limit the present invention.

Example 1

An alumina sol solution was prepared by dissolving aluminum sec-butoxide (hereinafter referred to as "Al(O-sec-Bu)$_3$") and ethyl acetoacetate (hereinafter referred to as "EtOAcAc") in 2-propanol (hereinafter referred to as "IPA") and by agitating the mixture for about three hours at room temperature. The molar ratio of the components in the alumina sol solution was 1:1:20 for Al(O-sec-Bu)$_3$, EtOAcAc, and IPA, respectively. Subsequently, 0.01 M hydrochloric acid aqueous solution was added to the alumina sol solution. The amount of hydrochloric acid added was set to be twice the molar ratio of $Al(O\text{-}sec\text{-}Bu)_3$. The mixture was then refluxed for approximately 6 hours, preparing a sol-gel coating liquid. The sol-gel coating liquid was applied onto a silica glass substrate, which serves as the base material, by spin coating to form a film thereon. The silica glass substrate was mirror polished in advance. The film was heat-treated at 100° C. for one hour to obtain a transparent alumina gel film. Subsequently, the alumina gel film was immersed in an 80° C. water bath for 30 minutes and dried at 100° C. for 10 minutes, to obtain an alumina layer having an uneven structure, which later serves as the dielectric portions 3.

Palladium chloride aqueous solution was subsequently applied by spin coating onto the alumina layer having the uneven structure and dried at 100° C. The product obtained was then immersed in a nickel-phosphorus plating solution (a phosphorus content of 1 to 2 wt %) heated at 80° C. for 40 minutes to form a nickel layer, which later serves as the structure body 1 having the uneven structure.

The metal portion having the alumina layer was peeled off from the silica glass substrate and then subjected to etching treatment. In the etching step, the etchant was 3M sodium hydroxide aqueous solution, and the etching time was set to be 50 hours. Observation using SEM and measurement using XPS revealed that the uneven structure of nickel was formed at the nickel layer (i.e., the metal layer) and the alumina (i.e., dielectric portion 3) remained on the uneven structure. The average height difference of the uneven structure was 272 nm, and the average surface roughness Ra' was 3.8 nm. The specific surface was 1.1.

Figure 5:
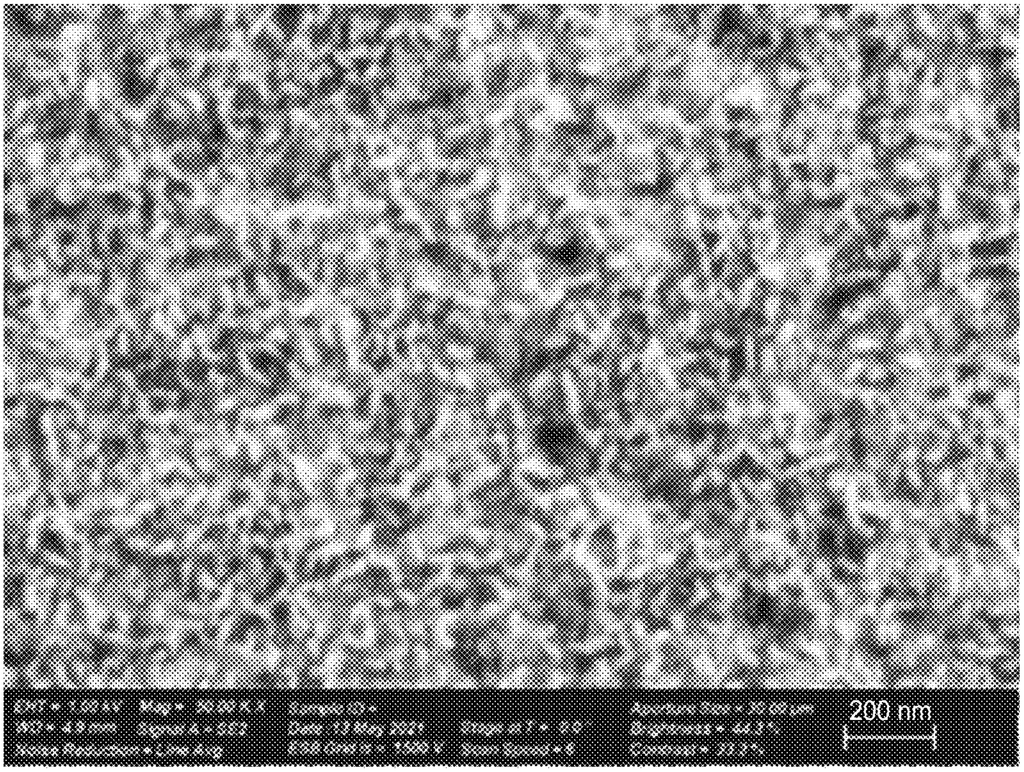
FIG. 5 is an SEM image of a surface of the substrate.

A magnetron gold sputtering system ("Quick Coater SC-701HMCII" manufactured by Sanyu Electron Co., Ltd) was used to form a gold film on the surface of the product obtained. The thickness of the gold film was set at three levels: 5 nm, 10 nm, and 15 nm. Sample substrates 10 were thus obtained. The surface of each substrate 10 was observed using a scanning electron microscope (commercial name "ULTRA 55" manufactured by Carl Zeiss). The observation conditions were set to an acceleration voltage of 1 kV and no coating. FIG. 5 is an SEM image of the surface of the substrate 10 for a gold film thickness of 15 nm. The SEM image of the surface of FIG. 5 shows that the gold film is formed on the uneven structure.

Raman Spectrum Measurement

Figure 6:
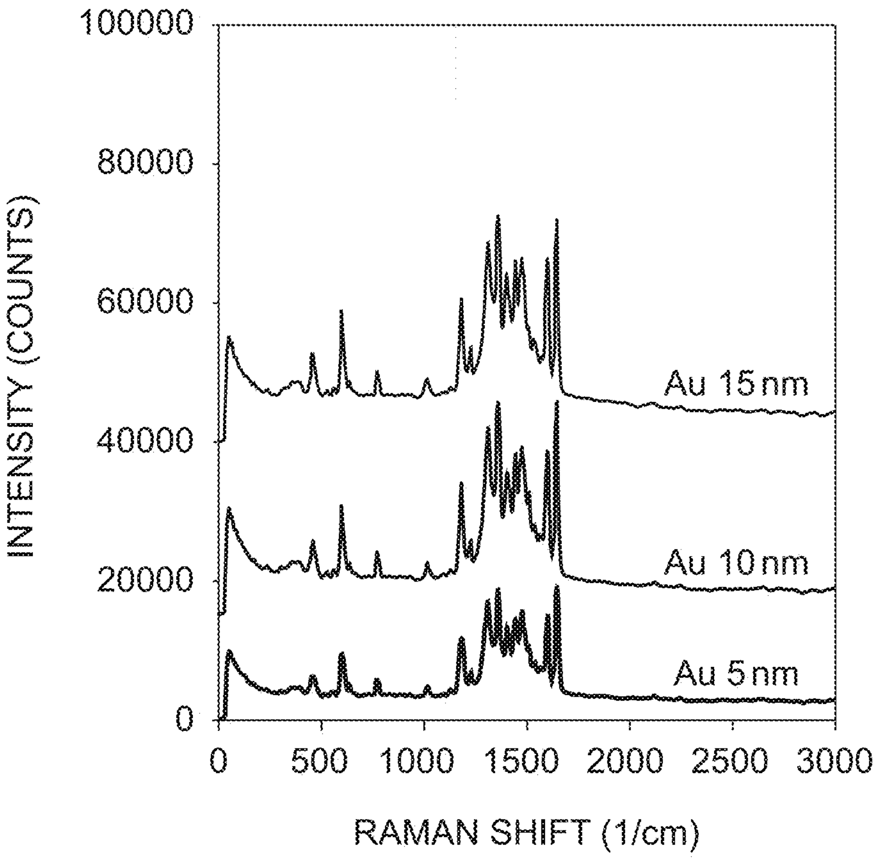
FIG. 6 is a graph depicting Raman spectra obtained.
Figure 7:
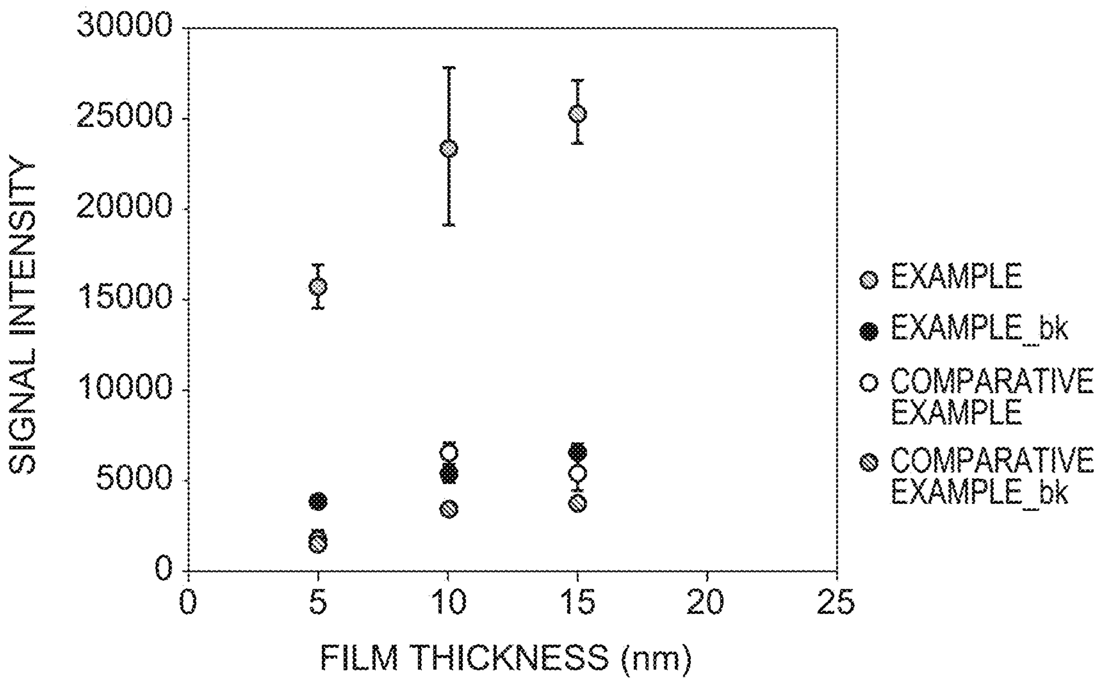
FIG. 7 is a graph illustrating Raman signal intensity ratio with respect to thickness of gold film.

Raman spectrum measurement was performed on a specimen that was a droplet of an aqueous solution of 100 μM Rhodamine 6G dye (R6G) dropped on each of the sample substrates 10. Measurement was performed as follows: A 3D laser Raman microspectroscopy system (Nanofinder 30 manufactured by Tokyo Instruments, Inc) was used with the following settings: excitation light source: He—Ne laser (wavelength 633 nm); laser power: 120 μW (ND 2.0); objective lens: 20× magnification (NA 0.45); pinhole diameter: 100 μm; diffraction grating: 300 gr/mm (measurement range: approximately 0 to 3000 $cm^{-1}$); exposure time: 10 s; and number of accumulations: 1 time. FIG. 6 depicts Raman spectra obtained. R6G Raman signal was detected for any of the gold thicknesses. It was confirmed that the substrate 10 described in the above example exhibited the effect of surface-enhanced Raman scattering (SERS effect). FIG. 7 illustrates Raman signal intensity with respect to thickness of gold film. The enhancement effect of surface-enhanced Raman scattering (SERS) was evaluated while the Raman peak near 1647 $cm^{-1}$ (representing stretching mode of C—C bond within aromatic ring) is taken as Raman signal intensity of R6G and background intensity is set to be an average signal intensity from 1700 to 1750 $cm^{-1}$. The ratio of signal intensity to the background was found to be high (i.e., signal-to-noise ratio is high) for any film thickness of gold. Evaluation results of the SERS effect for sample substrates 10 prepared in Example 1 are collated in Table 1. Under the column "Detection of SERS Signal Intensity" in Table 1, "A" means that the SERS signal intensity was detected, while "B" means that the SERS signal intensity was not detected. Under the column "Ratio of Signal Intensity to Background" in Table 1, "A" means that the ratio of Raman signal intensity of R6G to the background is high (i.e., signal-to-noise ratio is high), while "B" means that the ratio of Raman signal intensity of R6G to the background is low (i.e., signal-to-noise ratio is low).

Example 2

In Example 2, sample substrates 10 were manufactured while the conditions for alumina etching for the dielectric portion 3 and the thickness of the gold film for the structure body 1 were changed. In other words, sample substrates 10 were manufactured in the same manner as in Example 1 except that the etching time was changed. The etching time was set for 8 hours, 24 hours, 122 hours, 194 hours, 226 hours, and 338 hours. The thickness of the gold film was set to three levels, in other words, 5 nm, 10 nm, and 15 nm for each group of substrates 10 with the same etching time. Accordingly, a total of 18 sample substrates 10 were evaluated. Evaluation results of the SERS effect for sample substrates 10 prepared in Example 2 are also collated in Table 1. Raman spectrum measurement was performed and R6G Raman signal was detected for all of the sample substrates 10. It was confirmed that the sample substrates 10 described above exhibited the SERS effect. The ratio of signal intensity to the background was found to be high (i.e., signal-to-noise ratio is high) for any of the sample substrates 10. Among sample substrates 10 not being subjected to etching treatment, a sample substrate 10 having a gold film thickness of 5 nm was confirmed to exhibit the SERS effect.

Example 3

In Example 3, other sample substrates 10 were prepared using frosted silica glass for the base material 8 while other conditions were the same as those used in Example 1. The base materials 8 were made of frosted silica glass substrates with grit sizes of #1200, #600, #400, #240, and #120.

The thickness of gold film was set to three levels, in other words, 5 nm, 10 nm, and 15 nm for each group of sample substrates 10 having the same type of the base material 8. Accordingly, a total of 15 sample substrates 10 were evaluated. Evaluation results of the SERS effect for sample substrates 10 prepared in Example 3 are collated in Table 2. Raman spectrum measurement was performed and R6G Raman signal was detected for all of the sample substrates 10. It was confirmed that the sample substrates 10 described above exhibited the SERS effect. The ratio of signal intensity to the background was found to be high (i.e., signal-to-noise ratio is high) for any of the sample substrates 10.

Comparative Example 1

Samples made of an alumina layer having the uneven structure were prepared. The samples were not subjected to plating. Three types of gold film having thicknesses of 5 nm, 10 nm and 15 nm were formed on respective samples as is the case for Example 1, and Raman spectrum measurement was performed. FIG. 7 illustrates Raman signal intensity ratio with respect to the thickness of gold film. Although Raman signals were detected, the ratio of Raman signal intensity to the background was found to be low (i.e., signal-to-noise ratio is low) compared with the optical electric-field enhancement devices prepared in Examples above. Among samples with no etching treatment, Raman signals were not detected from samples having gold film thicknesses of 10 nm and 15 nm, in other words, the SERS effect was not confirmed for these samples as shown in Table 1.

TABLE 1

| | Etching Time [h] | Gold Film Thickness [mm] | Detection of SERS Signal Intensity | Ratio of Signal Intensity to Background |
|---|---|---|---|---|
| Example 1-1 | 50 | 5 | A | A |
| Example 1-2 | 50 | 10 | A | A |
| Example 1-3 | 50 | 15 | A | A |
| Example 2-1 | 8 | 5 | A | A |
| Example 2-2 | 8 | 10 | A | A |
| Example 2-3 | 8 | 15 | A | A |
| Example 2-4 | 24 | 5 | A | A |
| Example 2-5 | 24 | 10 | A | A |
| Example 2-6 | 24 | 15 | A | A |
| Example 2-7 | 122 | 5 | A | A |
| Example 2-8 | 122 | 10 | A | A |
| Example 2-9 | 122 | 15 | A | A |
| Example 2-10 | 194 | 5 | A | A |
| Example 2-11 | 194 | 10 | A | A |
| Example 2-12 | 194 | 15 | A | A |
| Example 2-13 | 226 | 5 | A | A |
| Example 2-14 | 226 | 10 | A | A |
| Example 2-15 | 226 | 15 | A | A |
| Example 2-16 | 338 | 5 | A | A |
| Example 2-17 | 338 | 10 | A | A |
| Example 2-18 | 338 | 15 | A | A |
| Comparative Example 1-1 | 0 | 10 | B | B |
| Comparative Example 1-2 | 0 | 15 | B | B |

TABLE 2

| | Base Material | Gold Film Thickness | Detection of SERS Signal Intensity | Ratio of Signal Intensity to Background |
|---|---|---|---|---|
| Example 3-1 | #1200 | 5 | A | A |
| Example 3-2 | #1200 | 10 | A | A |
| Example 3-3 | #1200 | 15 | A | A |
| Example 3-4 | #600 | 5 | A | A |
| Example 3-5 | #600 | 10 | A | A |
| Example 3-6 | #600 | 15 | A | A |
| Example 3-7 | #400 | 5 | A | A |
| Example 3-8 | #400 | 10 | A | A |
| Example 3-9 | #400 | 15 | A | A |
| Example 3-10 | #240 | 5 | A | A |
| Example 3-11 | #240 | 10 | A | A |
| Example 3-12 | #240 | 15 | A | A |
| Example 3-13 | #120 | 5 | A | A |
| Example 3-14 | #120 | 10 | A | A |
| Example 3-15 | #120 | 15 | A | A |

Accordingly, the present invention can provide an advantageous technique to improve the intensity of Raman scattered light.

The disclosure of the present invention is summarized as below.

Configuration 1

A substrate includes projections containing metal. The projections include a first projection on which a first metal portion is formed, the first metal portion containing at least one of gold, silver, platinum, copper, and palladium. The projections also include a second projection that is different from the first projection and on which a second metal portion is formed, the second metal portion containing at least one of gold, silver, platinum, copper, and palladium. The substrate further includes a dielectric portion that is present between the first projection and the first metal portion and also between the second projection and the second metal portion. A surface of the dielectric portion facing opposite to the projections follows shapes of the projections. A gap is provided between the first metal portion and the second metal portion, and a distance between the first metal portion and the second metal portion is 50 nm or less.

Configuration 2

In the substrate according to Configuration 1 above, the distance between the first metal portion and the second metal portion is 10 nm or less.

Configuration 3

In the substrate according to Configuration 1 or 2 above, the dielectric portion interfaces with the first metal portion and the second metal portion.

Configuration 4

In the substrate according to any one of Configurations 1 to 3 above, the dielectric portion contains alumina.

Configuration 5

In the substrate according to any one of Configurations 1 to 4 above, the second projection is positioned adjacent to the first projection.

Configuration 6

In the substrate according to any one of Configurations 1 to 5 above, the first metal portion and the second metal portion are discontinuous with each other.

Configuration 7

In the substrate according to any one of Configurations 1 to 6 above, the projections contain at least one of nickel, chromium, and zinc.

Configuration 8

The substrate according to any one of Configurations 1 to 7 above further includes an uneven structure that includes the projections and a depression formed between the projections. A height difference of the uneven structure is 100 nm or more and 1000 nm or less.

Configuration 9

In the substrate according to Configuration 8 above, the dielectric portion is present at the depression.

Configuration 10

In the substrate according to Configuration 8 or 9 above, the dielectric portion is exposed to a space above the depression.

Configuration 11

In the substrate according to any one of Configurations 1 to 10 above, the dielectric portion interfaces with the first projection.

Configuration 12

In the substrate according to any one of Configurations 1 to 11 above, a thickness of the first metal portion or the second metal portion is 5 nm or more and 50 nm or less.

Configuration 13

In the substrate according to any one of Configurations 1 to 12 above, a thickness of the dielectric portion is 30 nm or more and 200 nm or less.

Configuration 14

A substrate includes projections containing metal. The projections include a first projection on which a first metal portion is formed, the first metal portion containing at least one of gold, silver, platinum, copper, and palladium. The projections include a second projection that is different from the first projection and on which a second metal portion is formed, the second metal portion containing at least one of gold, silver, platinum, copper, and palladium. The substrate further includes a dielectric portion that is present between the first projection and the first metal portion and also between the second projection and the second metal portion. A thickness of the dielectric portion is 40 nm or more and 200 nm or less. A gap is provided between the first metal portion and the second metal portion, and a distance between the first metal portion and the second metal portion is 50 nm or less.

Configuration 15

In the substrate according to Configuration 14 above, a surface of the dielectric portion facing opposite to the projections follows shapes of the projections.

Configuration 16

In the substrate according to any one of Configurations 1 to 15 above, the substrate is configured to enhance Raman scattered light.

Analysis Method 1

An analysis method includes a step of placing a specimen on the substrate according to any one of Configurations 1 to 15 and a step of irradiating the specimen with light.

Analysis Method 2

In the step of irradiating the specimen according to Analysis Method 1 above, a wavelength of the light is 400 nm or more and 850 nm or less.

Apparatus 1

An apparatus includes the substrate according to Configuration 1 or 14 above and a light source. The light source is configured to emit light onto a specimen placed on the substrate.

Apparatus 2

The apparatus according to Apparatus 1 above further includes a spectroscope configured to measure Raman scattered light scattered by the specimen.

Manufacturing Method 1

A method of manufacturing a substrate includes a step of forming a dielectric portion having a first uneven structure formed on a surface thereof; a step of forming a structure body on the first uneven structure, the structure body containing metal and having a second uneven structure that is copied from the first uneven structure; a step of removing part of the dielectric portion in such a manner that the dielectric portion remains so as to cover projections of the second uneven structure and that a distance between a surface of the dielectric portion opposite to the structure body and a depression of the second uneven structure is smaller than a height difference between the projections and a depression of the structure body, the depression being adjacent to the projections; and a step of forming a first metal portion and a second metal portion, the first metal portion being formed on the dielectric portion that covers a first projection of the projections, the second metal portion being formed on the dielectric portion that covers a second projection of the projections, the second projection being different from the first projection, the first metal portion and the second metal portion containing at least one of gold, silver, platinum, copper, and palladium. In the step of forming the first metal portion and the second metal portion, a gap is provided between the first metal portion and the second metal portion, and a distance between the first metal portion and the second metal portion is 50 nm or less.

Manufacturing Method 2

In the step of removing part of the dielectric portion according to Manufacturing Method 1 above, the dielectric portion is removed in such a manner that the surface of the dielectric portion facing opposite to the structure body follows a copied uneven structure of the structure body.

Manufacturing Method 3

In the step of forming the first metal portion and the second metal portion according to Manufacturing Method 1 or 2 above, the distance between the first metal portion and the second metal portion is 10 nm or less.

Manufacturing Method 4

In the step of forming the first metal portion and the second metal portion according to any one of Manufacturing Methods 1 to 3, the first metal portion and the second metal portion interface with the dielectric portion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A substrate comprising:
projections containing metal,
wherein the projections include a first projection on which a first metal portion is formed, the first metal portion containing at least one of gold, silver, platinum, copper, and palladium,
wherein the projections include a second projection that is different from the first projection and on which a second metal portion is formed, the second metal portion containing at least one of gold, silver, platinum, copper, and palladium,
wherein the substrate further comprises a dielectric portion that is present between the first projection and the first metal portion and also between the second projection and the second metal portion,
wherein a surface of the dielectric portion facing opposite to the projections follows shapes of the projections, and
wherein a gap is provided between the first metal portion and the second metal portion, and a distance between the first metal portion and the second metal portion is 50 nm or less.

2. The substrate according to claim 1,
wherein the distance between the first metal portion and the second metal portion is 10 nm or less.

3. The substrate according to claim 1,
wherein the dielectric portion interfaces with the first metal portion and the second metal portion.

4. The substrate according to claim 1,
wherein the dielectric portion contains alumina.

5. The substrate according to claim 1,
wherein the second projection is positioned adjacent to the first projection.

6. The substrate according to claim 1,
wherein the first metal portion and the second metal portion are discontinuous with each other.

7. The substrate according to claim 1,
wherein the projections contain at least one of nickel, chromium, and zinc.

8. The substrate according to claim 1, further comprises:
an uneven structure that includes the projections and a depression formed between the projections,
wherein a height difference of the uneven structure is 100 nm or more and 1000 nm or less.

9. The substrate according to claim 8,
wherein the dielectric portion is present at the depression.

10. The substrate according to claim 8, wherein the dielectric portion is exposed to a space above the depression.

11. The substrate according to claim 1, wherein the dielectric portion interfaces with the first projection.

12. The substrate according to claim 1, wherein a thickness of the first metal portion or the second metal portion is 5 nm or more and 50 nm or less.

13. The substrate according to claim 1, wherein a thickness of the dielectric portion is 30 nm or more and 200 nm or less.

14. The substrate according to claim 1, wherein the substrate is configured to enhance Raman scattered light.

15. An analysis method comprising:

a step of placing a specimen on the substrate according to claim 1; and a step of irradiating the specimen with light.

16. The analysis method according to claim 15, wherein in the step of irradiating the specimen, a wavelength of the light is 400 nm or more and 850 nm or less.

17. An apparatus comprising:

the substrate according to claim 1; and a light source, wherein the light source is configured to emit light onto a specimen placed on the substrate.

18. The apparatus according to claim 17, further comprising:

a spectroscope configured to measure Raman scattered light scattered by the specimen.

19. A substrate comprising:

projections containing metal, wherein the projections include a first projection on which a first metal portion is formed, the first metal portion containing at least one of gold, silver, platinum, copper, and palladium, wherein the projections include a second projection that is different from the first projection and on which a second metal portion is formed, the second metal portion containing at least one of gold, silver, platinum, copper, and palladium, wherein the substrate further comprises a dielectric portion that is present between the first projection and the first metal portion and also between the second projection and the second metal portion, wherein a thickness of the dielectric portion is 40 nm or more and 200 nm or less, and wherein a gap is provided between the first metal portion and the second metal portion, and a distance between the first metal portion and the second metal portion is 50 nm or less.

20. The substrate according to claim 19, wherein a surface of the dielectric portion facing opposite to the projections follows shapes of the projections.

21. A method of manufacturing a substrate, comprising:

a step of forming a dielectric portion having a first uneven structure formed on a surface thereof;

a step of forming a structure body on the first uneven structure, the structure body containing metal and having a second uneven structure that is copied from the first uneven structure;

a step of removing part of the dielectric portion in such a manner that the dielectric portion remains so as to cover projections of the second uneven structure and that a distance between a surface of the dielectric portion opposite to the structure body and a depression of the second uneven structure is smaller than a height difference between the projections and a depression of the structure body, the depression being adjacent to the projections; and a step of forming a first metal portion and a second metal portion, the first metal portion being formed on the dielectric portion that covers a first projection of the projections, the second metal portion being formed on the dielectric portion that covers a second projection of the projections, the second projection being different from the first projection, the first metal portion and the second metal portion containing at least one of gold, silver, platinum, copper, and palladium, wherein in the step of forming the first metal portion and the second metal portion, a gap is provided between the first metal portion and the second metal portion, and a distance between the first metal portion and the second metal portion is 50 nm or less.

22. The method of manufacturing the substrate according to claim 21, wherein in the step of removing part of the dielectric portion, the dielectric portion is removed in such a manner that the surface of the dielectric portion facing opposite to the structure body follows the copied uneven structure of the structure body.

23. The method of manufacturing the substrate according to claim 21, wherein in the step of forming the first metal portion and the second metal portion, the distance between the first metal portion and the second metal portion is 10 nm or less.

24. The method of manufacturing the substrate according to claim 21, wherein in the step of forming the first metal portion and the second metal portion, the first metal portion and the second metal portion interface with the dielectric portion.

* * * * *